Jan. 24, 1950  G. R. WAID  2,495,556
VULCANIZING UNIT
Filed Feb. 21, 1948
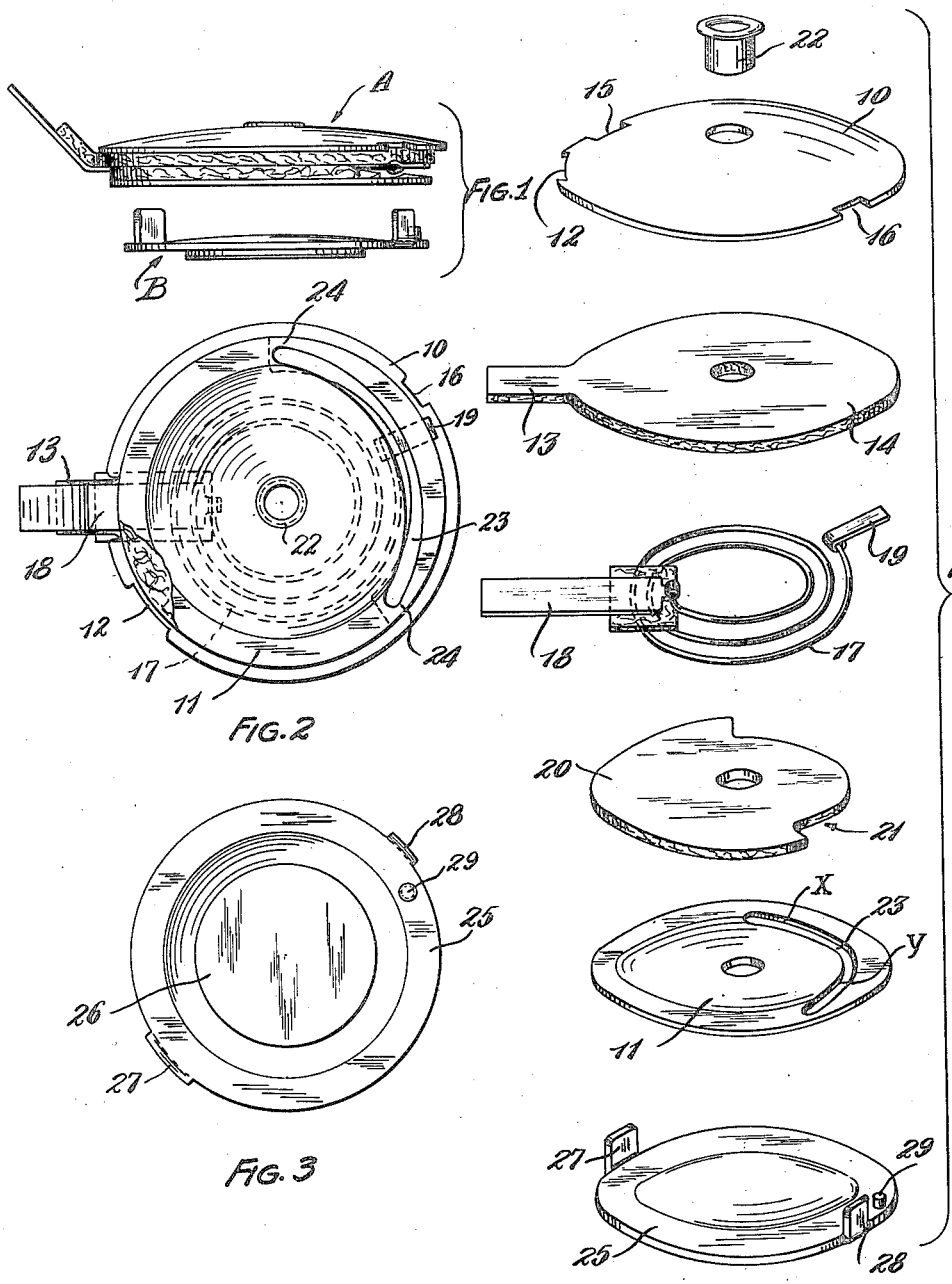
INVENTOR.
GEORGE R. WAID
BY
Kwis, Hudson, Boughton & Williams
ATTORNEYS Patented Jan. 24, 1950

2,495,556

UNITED STATES PATENT OFFICE 2,495,556

VULCANIZING UNIT

George R. Waid, Willoughby, Ohio, assignor to The Dill Manufacturing Company, Cleveland, Ohio, a corporation of Ohio Application February 21, 1948, Serial No. 10,032

3 Claims. (Cl. 219—19)

This invention relates to a vulcanizing unit and particularly to an electrical vulcanizing unit for vulcanizing patches upon rubber articles such as tire tubes, rubber balls, bags and the like.

The present invention is an improvement on the vulcanizing unit disclosed in Crowley Reissue Patent 21,230, reissued October 10, 1939, original Patent 2,075,705, issued March 10, 1937, on an application Serial No. 59,438, filed January 16, 1936.

The vulcanizing unit shown in said Crowley Reissue Patent 21,230 comprises a part or member which contains the heating element and which can be used repeatedly, together with a part or member carrying the vulcanizing patch and which is very simple and inexpensive and after use can be thrown away.

In use the first named member is superimposed upon the patch carrying member in a predetermined relative position with respect thereto and a fusible plug or element on the patch carrying member contacts an arcuate spring contact finger on the first member to press the same into electrical contact with a contact finger that is electrically connected to the heating element carried by the first named member. This heating element is also electrically connected to a contact which projects radially beyond the circumference of the first named member and to which one side of an electrical supply current may be connected while the other side of said current is electrically connected to the clamp in which the unit is used and which clamp applies the necessary vulcanizing pressure to the unit. The arcuate spring contact finger of the heating element carrying member of the vulcanizing unit shown in said Crowley Reissue Patent 21,230 is cut from the material of the plate forming the underside of said member and has a free end which overlies the contact finger that is connected to the heating element. Also in the patented construction the fusible plug on the patch carrying member of the unit is adapted to engage the spring contact finger referred to adjacent the free end of said finger. The difficulties inherent in the construction of the unit shown in said Crowley Patent 21,230 are that the spring contact finger having a free end tends to be caught in foreign objects with a resultant bending of the contact finger, or foreign objects readily work beneath the spring contact finger and prevent said finger being pressed into electrical contact with the contact finger that is connected to the resistance element or the fusible plug on the patch carrying member of the unit frequently fuses and runs around the free end of the spring contact finger and upon the other contact finger with the result that the two contact fingers may become united when the fusible material hardens.

An object of the present invention is to provide a vulcanizing unit similar to the unit shown in said Crowley Reissue Patent 21,230 but which avoids the difficulties and disadvantages of the patented construction and which were referred to above, in that the improved vulcanizing unit and particularly the member thereof carrying the heating element is provided with a spring contact portion that does not have a free end but is integrally connected at its opposite ends to the plate on the underside of the member which carries the heating element.

Further and additional objects and advantages not hereinbefore specified will become apparent hereinafter during the detailed description of an embodiment of the invention which is to follow.

Referring to the accompanying drawing illustrating said embodiment,

Fig. 1 is an elevational view of the vulcanizing unit with the two members thereof separated and with a portion of one of the insulating disks of the heating element carrying member broken away.

Fig. 2 is a plan view of the bottom or underside of the heating element carrying member of the unit, with a portion of the metal plate on said underside of the member broken away.

Fig. 3 is a plan view of the patch carrying member of the unit, and

Fig. 4 is an exploded view of the vulcanizing unit.

The vulcanizing unit comprises the member A which carries the heating element and the member B which carries the patch. The member A comprises a bowed metal disk 10 located at the upper side of the member and a bowed metal disk 11 located at the under or lower side of the member. The disk 10 in its periphery is provided with a recess 12 which overlies a radially extending arm 13 of an insulating disk 14 formed of asbestos or other suitable electrical insulating material and located immediately adjacent to the inner side of the metal disk 10. The metal disk 10 is also provided in its periphery with recesses 15 and 16, the purpose of which is fully explained in said Crowley Reissue Patent 21,230 and will also be pointed out hereinafter. The insulating disk 14 overlies a coiled electrical heating element 17, one end of which is electrically connected to a contact plate 18 that projects radially beyond the circumference of the disk 10 and underlies the radial arm 13 of the insulating disk 14. The other end of the heating element is electrically connected to a contact arm 19 extending substantially radially of the member but which does not project beyond the circumference of the insulating disk 14. A second insulating disk 20 is interposed between the heating element 17 and the lower or bottom metal disk 11 of the member A. The insulating disk 20 is provided in its circumference with an arcuate cut out portion 21 and the contact arm 19 extends into this cut out portion 21. The metal disks 10 and 11 and the insulating disks 14 and 20 are all provided with central registering openings, wherefore a rivet 22 passing through said openings maintains the disks in assembled relationship with the heating element 17 clamped between the insulating disks 14 and 20.

The lower metal disk 11 is provided with an arcuate opening or slot 23 which substantially overlies the arcuate cutout recess 21 of the insulating disk 20. The arcuate slot 23 is not on a true radius since the portions thereof located beyond the points indicated X and Y in Fig. 4 are on different radii than is the portion included between the points X and Y. In other words, the material of the disk 11 located radially outwardly of the slot 23 is integrally connected to the remainder of the disk by relatively narrow connecting portions or strips 24. These narrow connecting portions provide for flexure of the material lying radially outwardly of the slot 23 toward the insulating disk 14 and into engagement with the contact arm 19, it being recalled that the referred-to portion of the disk 11 overlies the arcuate cutout recess in the circumference of the insulating disk 20.

The patch-carrying member B of the unit comprises a bowed metal disk 25 on the concave or underside of which is mounted the patch 26. The disk 25 is provided at diametrically opposite points in its circumference with upstanding lugs 27 and 28 which when the members A and B are superimposed in use engage, respectively, in the recesses 15 and 16 of the disk 10 of the member A and locate the members in a predetermined relative position.

The upper side of the disk 25, as viewed in Fig. 4, is provided with a plug 29 formed of suitable fusible material and said plug functions when the members are superimposed and pressure applied thereto to flex that portion of the metal disk 11 of the member A which lies radially outwardly of the slot 23 into contact with the contact arm 19. The fusible plug 29 is so located that it engages the disk 11 at a point located in line with the lower side of the arm 19.

It will be understood that when the vulcanizing unit is used the members A and B are superimposed with the lugs 27 and 28 of the member B engaging in the recesses 15 and 16 of the disk 10 of the member A and then pressure is applied, with the result that the disks 10, 11 and 25 of the members are electrically connecting to the heating element through the contact arm 19 and fusible plug 29 which flexes the disk 11 into contact with said arm.

The unit is used in a suitable clamp and one side of the current supply for activating the heating element is connected to the clamp while the other side thereof is connected to the contact arm 18. In other words, the clamp with which the unit is used is included in the electrical circuit through the heating element. When the heat has reached a predetermined point the fusible plug 29 fuses, whereupon that portion of the disk 11 lying radially outwardly of the slot 23 flexes out of contact with the arm 19 and the circuit through the heating element is interrupted.

It will be seen that the portion of the disk 11 which is flexed by the fusible plug into contact with the contact arm 19 has no free end under which foreign objects are likely to work and no free end which might catch in obstacles and bend the flexible portion of the disk. It will also be noted that the fusible plug 29 engages the flexible portion of the disk 11 substantially at its widest point as distinguished from engaging it adjacent a free end thereof and hence when the plug fuses there is little likelihood that the molten metal from the plug will work beneath the flexible portion of the disk 11 and between such portion and the contact arm 19.

Although a preferred embodiment of the invention has been illustrated and described herein it will be understood that the invention is susceptible of various modifications and adaptations within the scope of the appended claims.

Having thus described my invention, I claim:

1. A vulcanizing device comprising a pair of cooperating superimposed members one of said members being adapted to have pressure applied thereto by a suitable clamping means and being provided with an insulated electrical resistance element having an exposed uninsulated portion, said member including a disk having a flexible portion overlying said exposed portion of said resistance element with said flexible portion integrally connected at its opposite ends to said disk, the other of said members being separable from said first member and adapted to carry a vulcanizing patch, and means carried by said second named member and acting when said members are arranged in superimposed relationship and pressure applied thereto to engage said flexible portion of the disk of said first member and flex the same into electrical contact with the exposed portion of said resistance element.

2. A vulcanizing unit as defined in claim 1 and wherein the flexible portion of said disk of said first member constitutes a disk portion integrally connected at its opposite ends to the main body of the disk and located outwardly of an arcuate slot formed in the disk.

3. A vulcanizing device comprising a pair of cooperating superimposed members, one of said members being adapted to have pressure applied thereto by a suitable clamping means and being provided with an insulated electrical resistance element having an exposed uninsulated portion, said member including a disk having a flexible portion overlying said exposed portion of said resistance element, the flexible portion of the disk comprising a portion located radially outwardly of an arcuate slot formed in the disk, said slot having portions formed on different radii and providing relatively narrow interconnecting strips between the opposite ends of the flexing portion of the disk and the main body of the disk, the other of said members being separable from said first member and adapted to carry a vulcanizing patch, and means carried by said second named member and acting when said members are arranged in superimposed relationship and pressure applied thereto to engage said flexible portion of the disk of said first member and flex the same into electrical contact with the exposed portion of said resistance element.

GEORGE R. WAID.

REFERENCES CITED

The following references are of record in the file of this patent:

UNITED STATES PATENTS

| Number | Name | Date |
| --- | --- | --- |
| 1,302,817 | Leonard | May 6, 1919 |
| 2,075,705 | Crowley | Mar. 30, 1937 |